United States Patent
von Spiegel et al.

(10) Patent No.: US 11,187,897 B2
(45) Date of Patent: Nov. 30, 2021

(54) HEAD-UP DISPLAY

(71) Applicant: CONTINENTAL AUTOMOTIVE GmbH, Hannover (DE)

(72) Inventors: Wolff von Spiegel, Bad Homburg (DE); Rudolf Mitsch, Frankfurt am Main (DE); Daniel Krüger, Michelstadt (DE); Ulf Stabenow, Mühltal (DE); Dirk Brömme-Jártimová, Stegen (DE)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 16/466,561

(22) PCT Filed: Nov. 23, 2017

(86) PCT No.: PCT/EP2017/080144
§ 371 (c)(1),
(2) Date: Jun. 4, 2019

(87) PCT Pub. No.: WO2018/104062
PCT Pub. Date: Jun. 14, 2018

(65) Prior Publication Data
US 2020/0073120 A1    Mar. 5, 2020

(30) Foreign Application Priority Data

Dec. 5, 2016 (DE) ............ 10 2016 224 162.1

(51) Int. Cl.
*G02B 27/01* (2006.01)
*G02B 30/26* (2020.01)
(Continued)

(52) U.S. Cl.
CPC ....... *G02B 27/0101* (2013.01); *G02B 3/0056* (2013.01); *G02B 5/021* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2005/0018295 A1* | 1/2005 | Mendlovic | G06T 7/262 359/558 |
| 2007/0003145 A1* | 1/2007 | Goldenberg | G02B 27/46 382/211 |

(Continued)

FOREIGN PATENT DOCUMENTS

| | | |
|---|---|---|
| DE | 11 2006 002 095 | 10/2008 |
| DE | 10 2009 054 232 | 5/2011 |

(Continued)

OTHER PUBLICATIONS

Andrew Maimone et al., "High-Efficiency Near-Eye Light Field Display", ACM Trans. Graph. Article, Mar. 17, 2015, https://cs.unc.edu/~maimone/media/Maimone_GTC2015.pdf.

(Continued)

*Primary Examiner* — Kee M Tung
*Assistant Examiner* — Khao Vu
(74) *Attorney, Agent, or Firm* — Cozen O'Connor

(57) ABSTRACT

A head-up display for a vehicle includes: a display panel, a deflector having a plurality of microlenses, and an image generator. The image generator is configured to generate a plurality of primary elementary images which are multiplied by an optical multiplier into elementary images, which are in turn assigned in each case to a respective one of the plurality of microlenses.

15 Claims, 9 Drawing Sheets

(51) Int. Cl.
*G02B 3/00* (2006.01)
*G02B 5/02* (2006.01)
*G02B 5/04* (2006.01)

(52) U.S. Cl.
CPC ......... *G02B 5/045* (2013.01); *G02B 27/0179* (2013.01); *G02B 30/26* (2020.01); *G02B 2027/014* (2013.01); *G02B 2027/0134* (2013.01); *G02B 2027/0187* (2013.01); *G02B 2027/0198* (2013.01)

(56) References Cited

U.S. PATENT DOCUMENTS

| | | | |
|---|---|---|---|
| 2009/0060281 A1* | 3/2009 | Tanida | G06T 3/00 382/106 |
| 2013/0015331 A1* | 1/2013 | Birk | G01J 1/44 250/208.2 |
| 2015/0219803 A1* | 8/2015 | Inamoto | G02B 27/0101 359/627 |
| 2016/0116735 A1* | 4/2016 | Hayashi | G02B 3/0006 345/7 |
| 2016/0209647 A1* | 7/2016 | Fursich | G02B 27/0093 |
| 2017/0168284 A1* | 6/2017 | Singer | G02B 21/0048 |
| 2019/0213938 A1* | 7/2019 | Atsuumi | G02B 27/48 |

FOREIGN PATENT DOCUMENTS

| | | |
|---|---|---|
| DE | 10 2015 221 008 | 4/2017 |
| WO | WO 2016/072518 | 5/2016 |

OTHER PUBLICATIONS

B. Lee et al., "Viewing-angle-enhanced integral imaging by lens switching", Optics Letters, vol. 27, No. 10, pp. 818-820, May 15, 2002.

A. Takeichi et al., "New 3D display using lens array and depth division images", Proc. Of SPIE vol. 6778, 2007.

H. Arimoto et al., "Integral three-dimensional imaging with digital reconstruction", Optics Letters, vol. 26, No. 3, pp. 157-159, Feb. 1, 2001.

International Search Report issued in corresponding application No. PCT/EP2017/080144.

Written Opinion issued in corresponding application No. PCT/EP2017/080144.

* cited by examiner

HEAD-UP DISPLAY

CROSS REFERENCE TO RELATED APPLICATIONS

This is a U.S. national stage of International application No. PCT/EP2017/080144, filed on Nov. 23, 2017, which claims priority to German Application No. 10 2016 224 162.1, filed Dec. 5, 2016, the content of each of which is incorporated herein by reference.

BACKGROUND OF THE INVENTION

1. Field of the Invention

The present invention relates to a head-up display for a vehicle.

2. Description of the Prior Art

Such head-up displays are used to superpose information relating to the vehicle state, the environment or other information in the windshield for the driver of the vehicle. It is also possible to display information for other occupants of the vehicle using a head-up display.

DE 10 2009 054 232 A1 discloses a head-up display having a display panel on which luminous points are able to be generated, the light rays of which are visible for an occupant of the vehicle by reflection at a windshield of the vehicle. This head-up display furthermore has a deflector having a multiplicity of microlenses, arranged in the beam path between the display panel and the windshield and deflect light rays from different luminous points into different radiation directions, and it has an image generator for generating different images. A disadvantage of this known head-up display is that two images are generated, one for each eye of the driver of the vehicle, or generally of the viewer, which are then to be assigned to the luminous points of the display panel. This assignment is non-trivial and, if performed inaccurately or in the case of an incorrect position or incorrect viewing angle of the viewer, frequently causes irritation for the viewer.

DE 10 2015 221 008 A1 discloses a head-up display for a vehicle, having a display panel, a deflector having a multiplicity of microlenses, and image generator which generates an image signal by which the display panel is actuated, wherein the image generator is configured to generate an image signal by which the display panel presents a multiplicity of elementary images, wherein each elementary image is assigned to a microlens. This solution requires a very highly resolving display panel so as to attain a resolution the viewer perceives as comfortable. Such an experience fatigues the viewer less, distracts the viewer less, and consequently increases driving safety. However, highly resolving display panels are expensive, which is why they are not currently used at least in mass production. The use of a less highly resolving display panel with reduced resolution of the elementary images or with a reduced number of the elementary images, or with a combination thereof or with other measures, likewise results in a resolution which the viewer perceives as relatively uncomfortable.

SUMMARY OF THE INVENTION

It is an object of the invention to configure the image generator such that it generates a multiplicity of elementary images which are each assigned to a microlens. This has the advantage that, instead of generating two different images for the left and the right eye of the viewer, of a driver of the vehicle, or of another occupant, and decomposing these images and assigning them individually to the image points of the display panel (i.e., the display), elementary images are generated that correspond to the image which the display to be presented would image effectively by the microlens on the plane of the display panel. By inverting the direction of the light rays, a much more accurate image of the display is achieved, which additionally takes into consideration the position of the eyes of the viewer relative to the head-up display. The image generator to this end has a calculation unit (i.e., a calculator) that calculates the multiplicity of elementary images. Rather than a windshield, it is also practicably possible to use what is known as a combiner or another suitable mirror element.

According to an aspect of the invention, the image generator has an optical multiplier. The optical multiplier multiplies a primary elementary image, calculated by a calculation unit, into a plurality of elementary images that are then assigned in each case to a microlens. Here, a primary elementary image is preferably multiplied to 3×3, that is to say nine elementary images, to 4×4 or to 2×4 elementary images. A smaller or greater number of elementary images or more elongate elementary images are also advantageously possible, but require a more complex multiplier construction. One advantage of using an optical multiplier is that a smaller number of image points of the display panel suffices to still attain a large number and good resolution of the elementary images. This results in a high-quality image impression for the viewer, even though a correspondingly high image resolution of the display element is dispensed with. According to an aspect of the invention, the requirement in terms of the resolution of the display panel is lowered by performing optical replication of primary elementary images into elementary images.

The image generator advantageously has a calculator, used to calculate letters, symbols and/or characters such that they are presented to the viewer such that they appear to be located at a respectively appropriate distance. Another advantage is that, during the calculation, a curvature of a windshield, of another reflective element, or of another element in the beam path is compensated.

The optical multiplier has, according to an aspect of the invention, a multiplicity of n×m lens matrices. Here preferably n=m=3. However, other advantageous configurations with m≠n are possible. The lens elements of the n×m lens matrix image a primary elementary image onto n×m correspondingly reduced-size elementary images. The lens elements in the simplest case are sections of a lens that images at a reduced scale, arranged with a corresponding offset or inclination.

Advantageously, the lens elements of an n×m lens matrix are decomposed into partial elements arranged interleaved to form the n×m lens matrix. This has the advantage that the effective aperture of each lens element is enlarged.

According to an aspect of the invention, the optical multiplier has a multiplicity of n×m prism matrices. Using the prism elements of an n×m prism matrix, the respective light cone is realigned such that it is directed at the correct microlens.

Advantageously, the prism elements of the n×m prism matrix are provided with a diffuser, which is advantageously integrated in the prism matrix. This has the advantage of attaining a compensation or a blurring of artifacts. Such artifacts can occur due to the division of the lens matrix, as is shown further below with reference to FIG. 4.

According to an aspect of the invention, the optical multiplier is configured, in addition to the multiplication of the primary elementary images, to also cause a displacement of the elementary images. Even though identical multiplication of a primary elementary image into a plurality of identical elementary images causes a favorable impression for viewer, because the number of the elementary images plays a large role for the optical impression of the viewer, it has been found that a different displacement of the individual elementary images relative to one another creates an even better optical impression. The displacement is effected here toward the central optical axis of the head-up display, wherein projecting parts of the elementary images after the displacement are cut off. This improves the optical impression for the viewer. For the cutting off, preferably a stop is provided.

This stop is for example an opaque piece formed between the microlenses, the lens elements, or the prism elements. Although a presentation that is individually calculated for each elementary image produces an even better impression for the viewer, the inventors have found that this measure according to the invention is already so close to optimum that in nearly all cases no difference, or hardly any difference, with respect to the optimum is perceivable by the viewer.

According to an aspect of the invention, the head-up display has a position detector and an image displacer, which receives the detected position signal. The position detector is used to detect the position of the head or the position of the eyes of the viewer.

The image displacer is preferably integrated in the image generator, which displaces the elementary images to be displayed on the display panel or primary elementary images according to the change in the position of the eyes of the viewer so as to adjust the eyebox, as it is known, in a tracking fashion. Eyebox refers to the spatial region from which the observer sees the virtual image presented by the head-up display in its entirety. This displacement has the advantage that the display can operate with a smaller number of pixels while still achieving a highly resolved presentation for the viewer. Tracking adjustment is attainable for example using a position detector, which are already present in the vehicle, for head or eye position detection without undue additional outlay. The n×n lens matrix is correspondingly adapted to the smaller eyebox with respect to focal length, position and orientation of the lens elements. Due to the image displacer according to the invention, it is possible to attain an approximate halving of the eyebox that is to be covered optically from a width of 150 mm to 75 mm. As a consequence, better resolution is achieved.

The head-up display preferably has an image alternator which makes possible alternating presentation of elementary image or primary elementary image for the left and the right eye on overlapping regions of the display panel. This has the advantage that the total number of required image points of the display panel is reduced. For one eye, approximately a width of the eyebox of 20 mm that is to be covered optically suffices, which constitutes approximately a quarter of an eyebox having a width of 75 mm in the case of head position detection. The gain here is approximately a factor of four because at one point in time only 20 mm need to be covered.

According to one aspect of the invention, a method for operating a head-up display for a vehicle having a display element, a grid of microlenses connected downstream thereof, and a mirror element includes the following: generating a multiplicity of elementary images that corresponds in each case effectively to an image of an elementary camera of a multiplicity of adjacently arranged elementary cameras, presenting the primary elementary images next to one another on a display element, optically multiplying the primary elementary images into elementary images. Advantages of this method correspond to those described in relation to the device according to an aspect of the present invention.

In another aspect, an advantageous configuration of the method may consist of the following additional steps: calculating a multiplicity of primary elementary images and optically multiplying the calculated primary elementary images, displacing the individual multiplied primary elementary images with a respectively adapted absolute value toward the optical axis of the head-up display according to the parallax, detecting the position of the head or the eyes of a viewer and displacing the images presented on the display element in accordance with the position change, presenting in alternating fashion the images for the right and the left eye on the display panel. The advantages in this case also correspond to those described relating to the device.

BRIEF DESCRIPTION OF THE DRAWINGS

Further advantages and configurations of the invention are also apparent from the following description of exemplary embodiments.

In the drawings.

DETAILED DESCRIPTION OF THE PRESENTLY PREFERRED EMBODIMENTS

Figure 1:
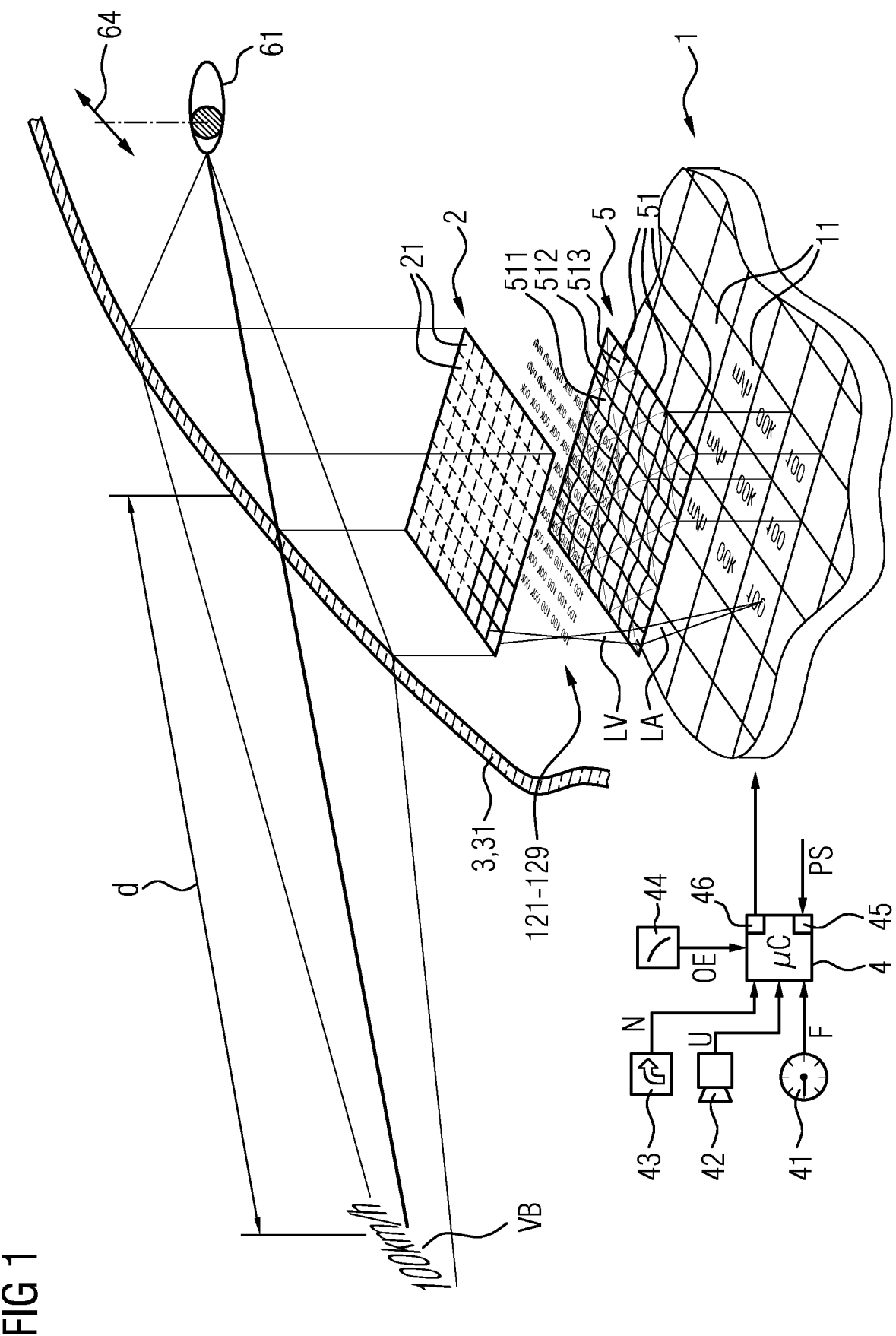
FIG. 1 shows a head-up display according to the invention.

FIG. 1 shows a head-up display according to an aspect of the invention, having a display panel 1, a deflector 2 having a multiplicity of microlenses 21, an image generator 4, and a mirror 3. The mirror is shown here as the windshield 31 of a vehicle. The display panel 1 is a self-luminous display on OLED basis or another self-luminous display or a trans-illuminated display, for example on LCD basis. Luminous points (not illustrated here) are generatable on the display panel 1, and the light rays LA of the luminous points are reflected, after passing through one or more further optical elements, by the windshield 31 and strike an eye 61 of a viewer. Light rays from the environment of the vehicle likewise pass through the windshield 31 into the eye 61. The viewer therefore sees the environment superimposed by an image generated by the head-up display. In the left-hand region, the superposed virtual image VB can be seen, which here shows a speed indication "100 km/h." On the display panel 1, a multiplicity of primary elementary images 11 can be seen, which are arranged, one next to the other, in a grid. The speed indication of the virtual image VB can be seen presented in mirror-inverted fashion. The light rays LA coming from an individual primary elementary image 11 of the display panel 1 are incident on an optical multiplier 5. The optical multiplier 5 has a multiplicity of 3×3 lens matrices 51. Each lens matrix 51 multiplies a primary elementary image 11 into nine elementary images 121-129. The corresponding light rays LV of the elementary images 121-129 are incident on in each case one microlens 21. The deflector 2 is arranged in the beam path between the display panel 1 and the mirror 3 and deflects the light rays LA, LV of different luminous points of the display panel 1 into different radiation directions.

The image generator 4 generates, for each lens matrix 51, a primary elementary image 11 that is to be superimposed on the environment light. The corresponding information is transferred to the display panel 1. The primary elementary image 11 in the example shown includes vehicle state information F, environment information U, and navigation information N. The vehicle state information F originates, for example, from a speedometer 43, which is indicated here. The environment information U originates from a camera 42, which is indicated here, and the navigation information N originates from a navigation device 43, which is indicated here. These are fed to the image generator 4 and processed thereby. The resolution of the virtual image perceived by the viewer depends on the density of the microlenses 21. In the case of a planar windshield 31, each elementary image 121-129 is practically not distorted in the beam path to the eye 61. In the case of a curved windshield 31, slight differences in distortion occur, and compensation is necessary. It has been found that it is sufficient to perform this compensation for the primary elementary image so that the compensation for all elementary images formed from a primary elementary image is the same. The compensation is calculated by the image generator 4 on the basis of optical properties OE of the windshield 31, which it takes from a data set 44.

The head-up display operates on what is known as the integral imaging principle, which will be explained further below. The distance d at which the virtual image VB can be seen in front of the windshield 31 is shown.

A position sensor 64 (indicated by a double-headed arrow) detects a change in the position of the eye 61 in the horizontal direction. A corresponding position signal PS is supplied to the image generator 4. An image displacer 45 of the image generator 4 calculates therefrom a displacement of the primary elementary images 11 that are to be presented on the display panel 1. If different images for the left and right eye for in each case a separate eyebox of narrow width b3 are desired, instead of an image alternator 45 of the image generator 4 generates alternating primary elementary images 11, which are presented on the display panel 1. More details in this respect are described further below with reference to FIGS. 8-10. In a development, the position sensor 64 also detects the change in the position of the eye 61 in the vertical direction, which is correspondingly evaluated for the displacement of the pixels that are to be presented.

Figure 15:
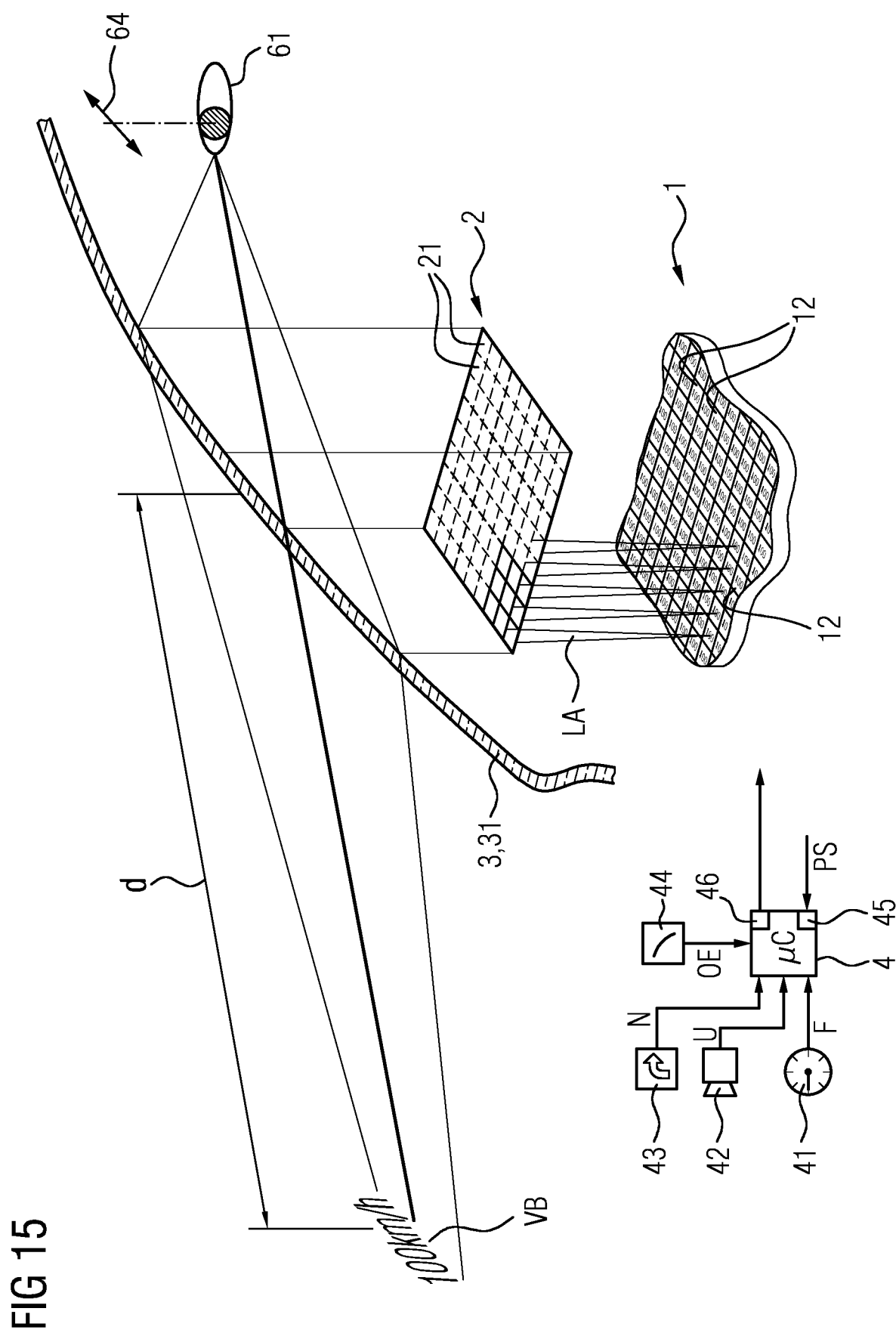
FIG. 15 shows a head-up display according to the invention.

FIG. 15 shows an alternative aspect of the inventive head-up display, in which no optical multiplier is present. Here, the elementary images 12 are generated directly by the display panel 1. The light rays LA, which are indicated schematically here as in FIG. 2 by way of light cones, in this case directly travel from the display panel 1 onto the microlenses 21 of the lens 2. What was stated above relating to the primary elementary images 11 or the elementary images 121-129 applies here correspondingly adapted to the elementary images 12. All other elements illustrated correspond to those in FIG. 2 and are provided with corresponding reference signs.

Figure 2:
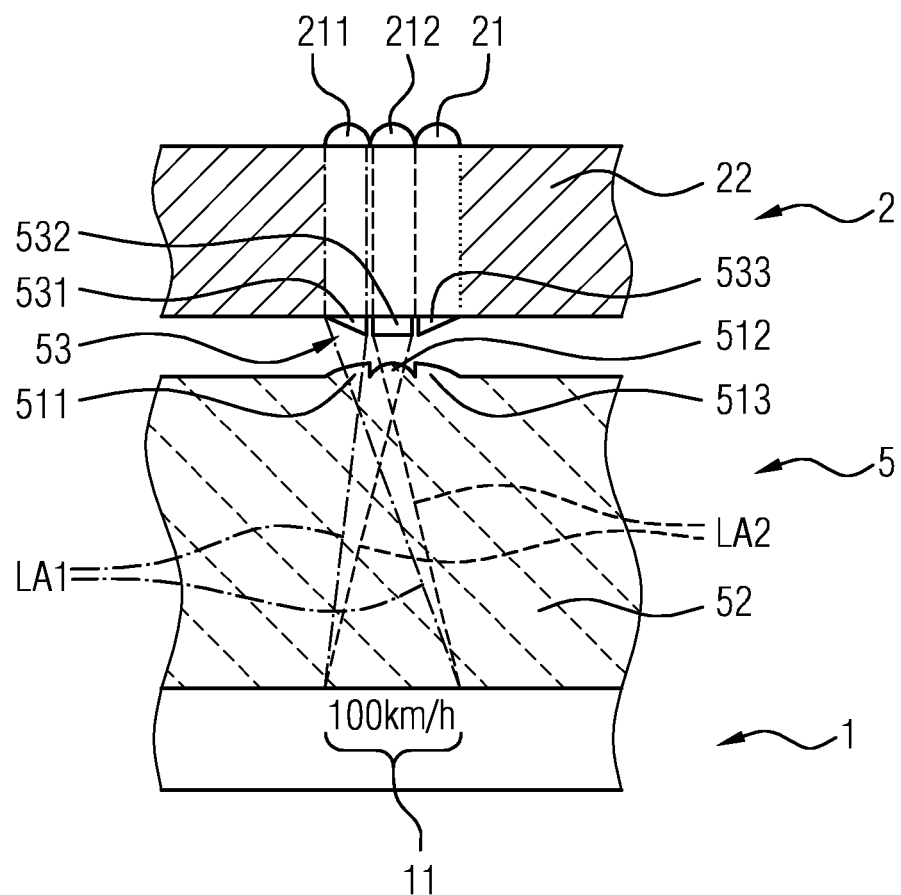
FIG. 2 shows a deflector and optical multiplier.

FIG. 2 shows, as an advantageous exemplary aspect, the deflector 2 and an optical multiplier 5 illustrated in section. The optical multiplier 5 has a transparent plate 52, which is placed on the display panel 1. The speed indication of a primary elementary image 11 is indicated schematically. Light rays LA1, LA2 pass through the transparent plate 52 and are guided by lens elements 511, 512, 513, onto, in each case, one prism element 531, 532, 533 of a 3×3 prism matrix 53. The prism matrix 53 is likewise part of the optical multiplier 5, but arranged in this case on the bottom side of a transparent plate 22 on whose upper side the microlenses 21 of the deflector 2 are arranged. The light rays LA1, the light beam of which is delimited by the dashed-dotted lines, travel through the lens element 511, pass through the gap between transparent plate 52 and transparent plate 22, and are then guided by the prism element 531 onto the microlens 211. The light beam of the light rays LA2 is delimited by dashed lines, passes through the central lens element 512, the central prism element 532, and then the microlens 212. In this way, a light beam that corresponds to the entire primary elementary image 11 exits from each of the microlenses 21, 211, 212. This is consequently multiplied. For the sake of simplicity, only one primary elementary image 11 and the associated lens matrix 51, prism matrix 53, and microlenses 21, 211, 212 are shown here. This is adjoined to the left and right by corresponding structural parts for the adjacent primary elementary images (not illustrated here). The gap between the two transparent plates 22, 52 is either filled with air or with another optically transparent material.

Figure 3:
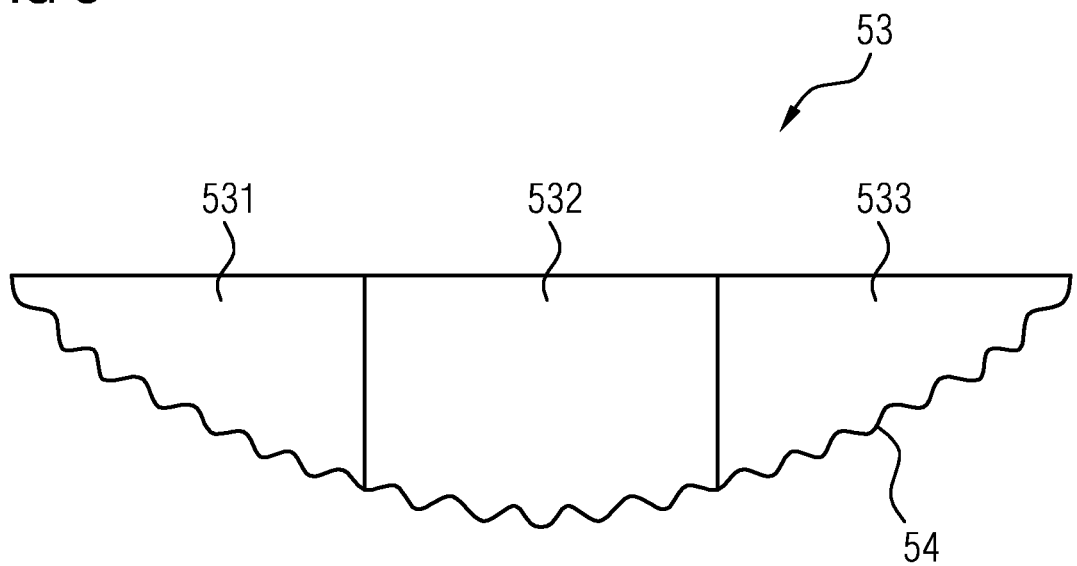
FIG. 3 shows a detail of a prism matrix.

FIG. 3 shows a detail of a prism matrix 53 in cross section. It shows the central prism element 532, which is substantially a small plate having plane-parallel surfaces. Since the central lens element 512 is arranged perpendicularly in the optical beam path, that is to say exhibits no inclination, no inclination compensation by a prism is necessary here. The prism element 531 illustrated on the left has a prism structure, which is configured such that it compensates the inclination of the main radiation direction through the lens element 511 in the optical beam path. Similar applies to the prism element 533 with respect to the lens element 513. The prism elements 531, 532, 533 have, on their downward-facing surfaces, a roughened surface that acts as a diffuser 54.

Figure 4:
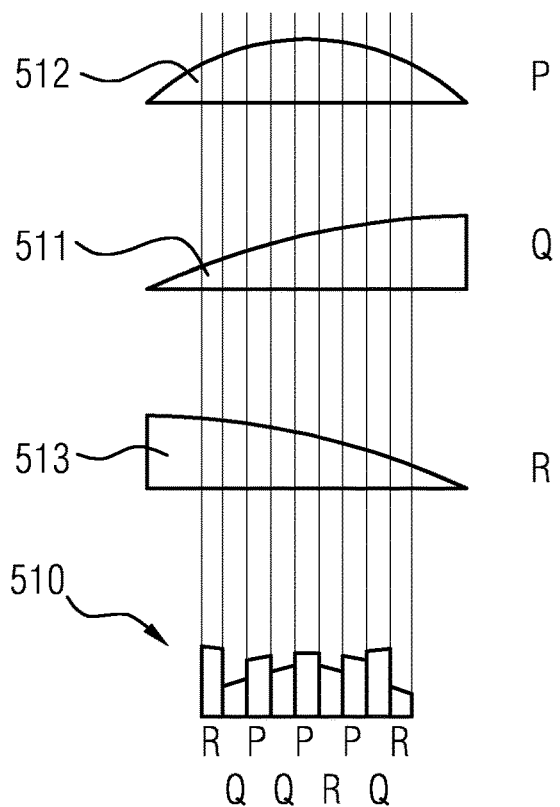
FIG. 4 shows a lens element and lens partial elements.

FIG. 4 shows three lens elements 511, 512, 513, which are configured such that they would, in each case, fill out the entire surface area of a cell of the prism matrix 53. Lens partial elements 510 are cut out along the perpendicular dividing lines and assembled as shown in the lower part of FIG. 4. The manner of assembly shown here is only an example, the letters P, Q, R indicate which of the lens partial elements 510 correspond to which of the lens elements 511, 512, 513. The lens partial element 510 with the letter R here fulfills the function of the lens element 513, but has a greater aperture diameter for each individual lens than the corresponding lens element 513, as illustrated in FIG. 2. Similar applies to the lens partial elements 510 designated with the letters P and Q.

Figure 5:
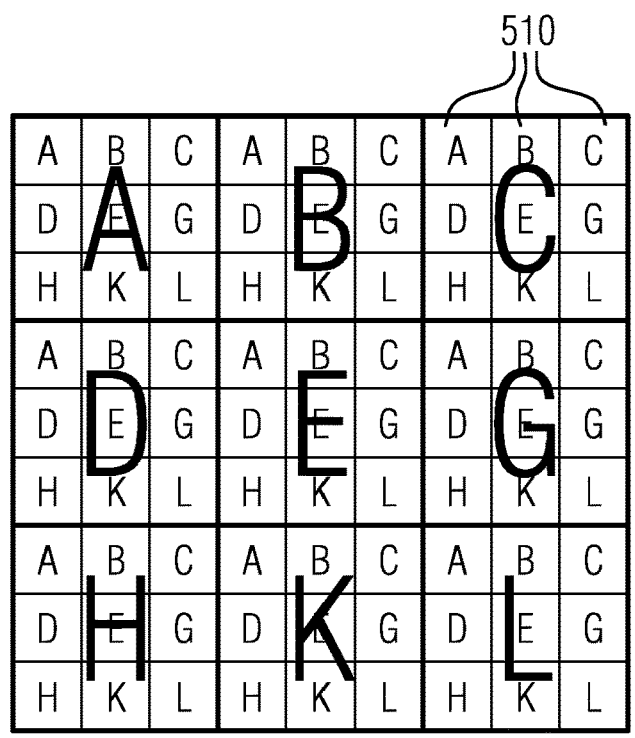
FIG. 5 shows a schematic arrangement of lens partial elements.

FIG. 5 shows a schematic arrangement of lens partial elements 510 in plan view. The central lens element 512 designated with the letter E is divided over nine lens partial elements 510 having the letter E and consequently covers a larger effective area. Corresponding statements apply to the other lens partial elements 510, which are marked with the letters A, B, C, D, G, H, K, L. The regular arrangement presented here is only one example, and other divisions and differently distributed arrangements, even irregularly distributed arrangements, likewise fall within the scope of the invention.

Figure 6:
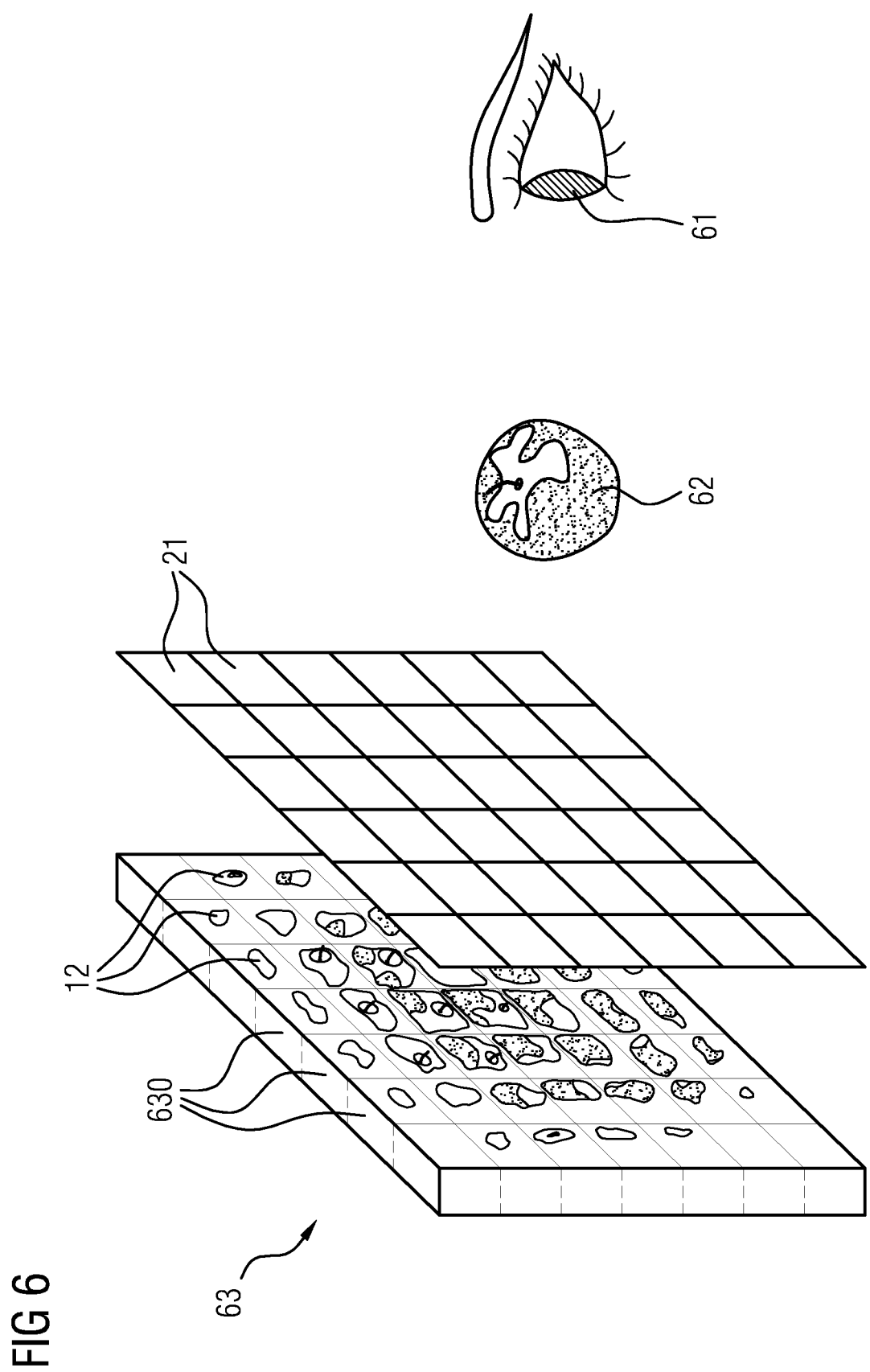
FIG. 6 shows the principle of "integral imaging;"

FIG. 6 shows the principle of integral imaging. Integral imaging refers to a technology that makes it possible to display autostereoscopic or multistereoscopic images. With corresponding performance, it furthermore becomes possible to accommodate to each depth plane. In the head-up display this means that the viewer can switch between environment and presented display without refocusing. Integral imaging in the ideal case covers all significant depth cues, in the case of small lenses it also covers accommodation. The viewer can see three-dimensional images without using special glasses. The prerequisite herefor is created by way of the positioning of the microlenses 21 over a conventional two-dimensional display panel 1. Hereby, a light field is approximated which makes it possible for the viewer to focus to different depths of the presented scene. The inverted case is shown: a real scene, here represented by an apple 62, is imaged onto a two-dimensional image sensor 63 by many slightly displaced microlenses 21 in many slightly displaced perspectives. The three-dimensional information of the apple 62 is thus transformed into many images from many different perspectives. The resulting individual images from the different perspectives are referred to as elementary images 12. It is conceivable that each elementary image 12 is recorded by an elementary camera 630. In that case, a multiplicity of elementary cameras 630 are used instead of the image sensor 63. If the recorded grid of elementary images 12 is again appropriately viewed through the grid of microlenses 21, the eye 61 sees the originally recorded three-dimensional scene.

Figure 7:
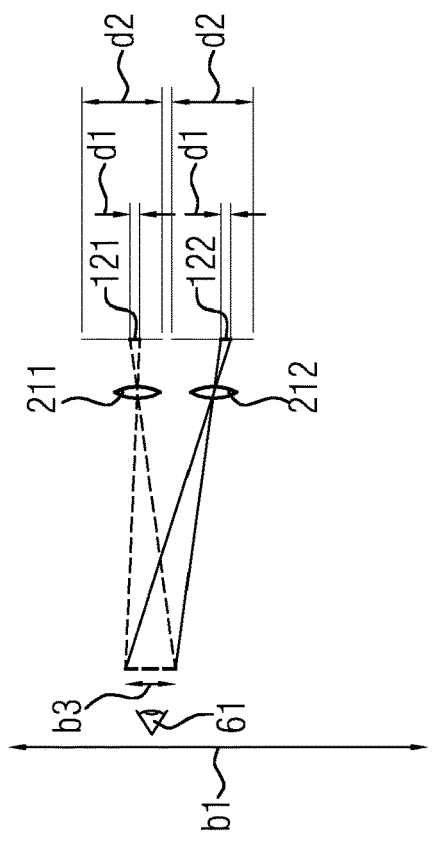
FIG. 7 shows size ratios in the case of a wide eyebox.

FIG. 7 shows size ratios in a head-up display according to the invention with a wide eyebox. Schematically, the width b1 of the eyebox is indicated in this respect. A microlens 211 images an elementary image 121 onto the width b1. A microlens 212 images the elementary image 122, which is presented adjacently on the display panel 1, onto the width b1 of the eyebox. For the sake of clarity, illustration of further optical elements, such as the optical multiplier 5, is dispensed with here.

Figure 9:
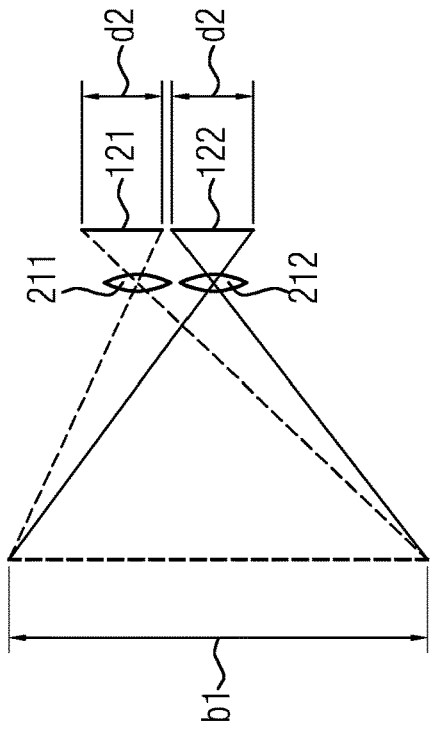
FIG. 9 shows size ratios in the case of an eyebox of medium width.

FIG. 9 shows the size ratios similar to FIG. 7, but in this case for an eyebox of medium width b2. It can be seen that it is approximately half the width b1 of the wide eyebox. Microlenses 211, 212, 213 image elementary images 121, 122, 123 onto the width b2 of the eyebox. It can be seen that the elementary images 121, 122, 123 are smaller than those of FIG. 7, and consequently require in each case less surface area of the display panel 1. In the case of a smaller width b2 of the eyebox, a smaller surface area of the display panel per elementary image thus suffices. If the same surface area is used, the requirement in terms of the resolution of the display panel decreases with a corresponding design. If the width b1 is selected as b1=150 mm, the eyebox covers the width that usually suffices for to- and fro-movements of the head of the viewer. If a smaller eyebox with a width of b2=75 mm is selected, it covers the normal intraocular distance of a viewer, although the eyebox needs to be readjusted in the case of a movement of the head to the side. This is indicated by the displacement v. The elementary images 121, 122, 123 are here displaced by the distance ve, as can be seen in comparison with the following FIG. 10. In the case of a lateral movement of the eyes 61 of the viewer, the eyebox of the medium width b2 is therefore also displaced by the displacement v, which requires a presentation of the elementary images 121, 122, 123 on the display panel 1 that is displaced by the distance ve. The image generator 4 is therefore configured to perform a corresponding displacement as a response to a corresponding sensor signal.

Figure 10:
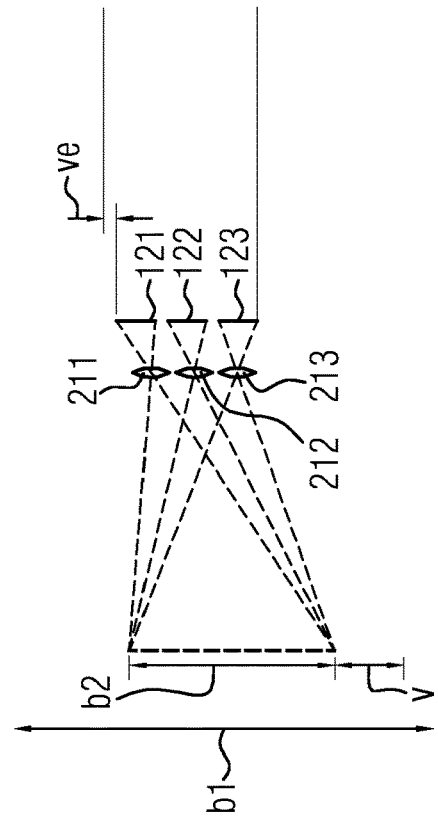
FIG. 10 shows size ratios in the case of an eyebox of medium width.

FIG. 10 shows the same arrangement of microlenses 211, 212, 213 as FIG. 9 and a corresponding medium width b2 of the eyebox. However, it is here displaced by the displacement v due to a lateral movement of the head of the viewer. The elementary images 121, 122, 123 are thus displayed on the display panel 1 in a manner displaced by the distance ve, as calculated by the image generator 4. When compensating the curvature of the windshield 33, the adaptation performed is possibly somewhat more than just the displacement ve. This is often also referred to as distortion.

Figure 8:
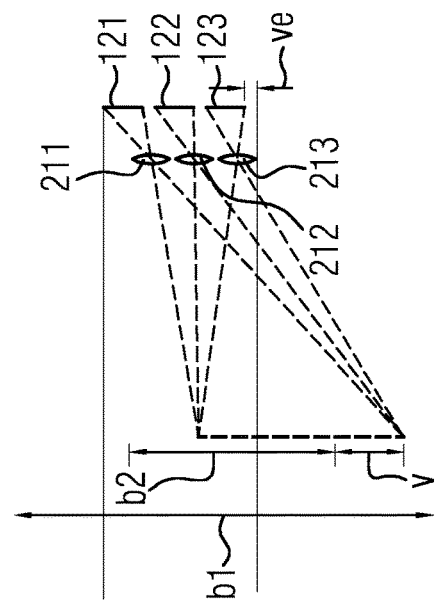
FIG. 8 shows size ratios in the case of a narrow eyebox.

FIG. 8 shows an eyebox with a narrow width b3, which covers the width of an eye 61. It is apparent that the elementary images 121, 122, which are imaged through the microlenses 211, 212, have a significantly smaller dimension d1 than the dimension d2 of the corresponding elementary images 121, 122 of FIG. 7. An even smaller surface area of the display panel 1 per elementary image consequently suffices in an eyebox having a narrow width b3 covering an eye 61. However, it should be noted that each eye 61 requires a dedicated eyebox and that time-division multiplexing is required. The requirement in terms of the resolution of the display panel 1 is still reduced again as compared to the eyebox having a medium width b2 shown in FIG. 9 and FIG. 10.

Figure 11:
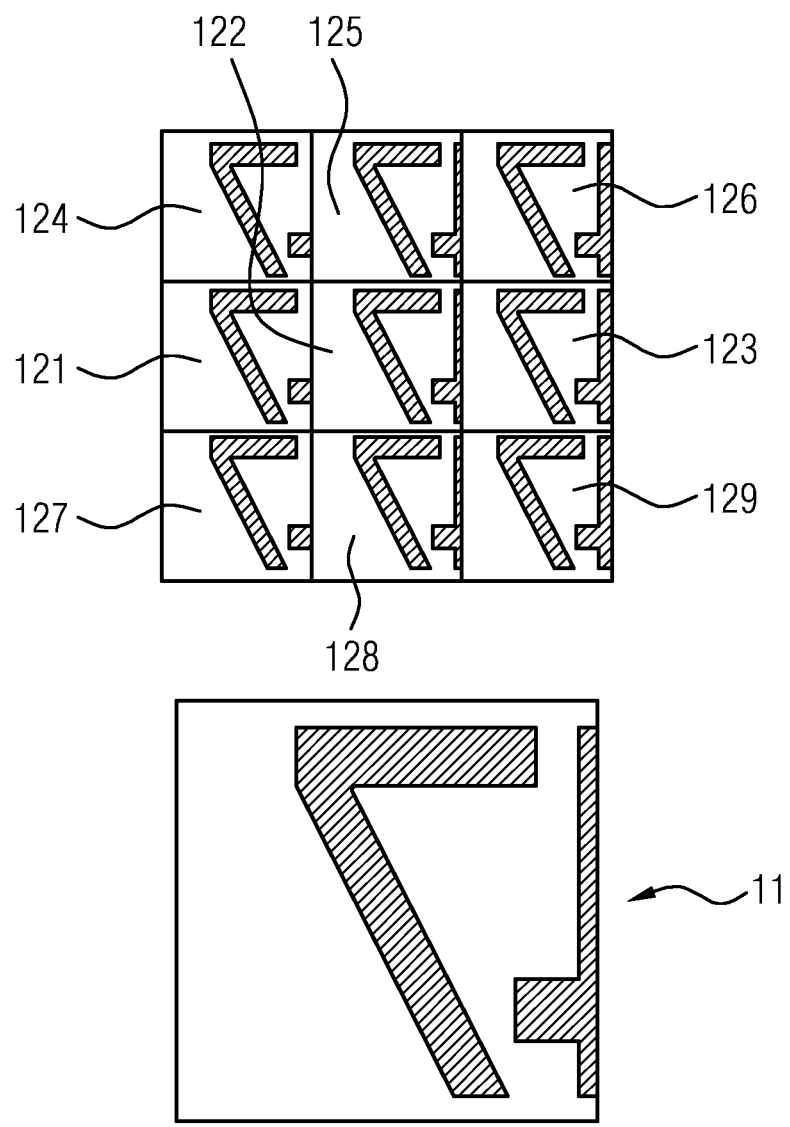
FIG. 11 shows a primary elementary image and elementary images.

FIG. 11 shows a primary elementary image 11 and elementary images 121-129, which are multiplied therefrom. In the present case, this is the presentation of the number "47," of which in this primary elementary image only the number "7" and a rear part of the number "4" can be seen in mirror-inverted fashion. It is apparent that the elementary image 129 actually corresponds the most to the reduced-size primary elementary image 11, while all other elementary images 121-128 were formed from the primary elementary image 11 by greater displacement and cutting-off. This displacement is attained by suitable adaptation of the surface areas of the lens elements 511-513 and the corresponding prism elements 531-533. The elementary images 124, 125, 121, 122, 127, 128, which are imaged to the left of the elementary image 129, are displaced to the right. The elementary images 121-126, which are shown above the elementary image 129, are downwardly displaced. As a result, elementary images are produced which almost correspond to the elementary images which are recorded in the ideal case in integral imaging—see FIG. 6—by the individual elementary cameras 630.

Figure 12:
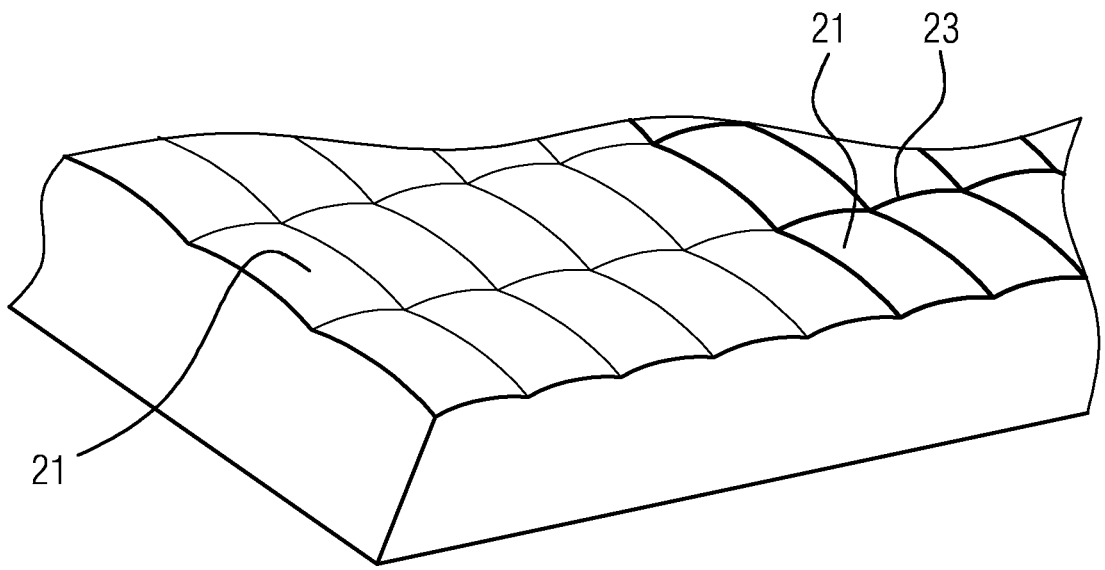
FIG. 12 shows a section of a grid of microlenses.

FIG. 12 shows a section of an example of a grid made of microlenses 21. The microlenses here cover a rectangular surface area, such that all luminous points of the display panel 1 which present an elementary image 12 or a primary elementary image 11 are also completely located below an optically effective surface area of the microlenses 21. In an alternative part of the grid shown, opaque regions 23, which serve, for example, for covering displaced parts of a primary elementary image 11, which are not part of an elementary image 121-128, are located between the microlenses 21. The rectangular arrangement corresponds to a rectangular form of the elements of the display panel 1. For example, it has pixels that extend further in the vertical direction than in the horizontal direction.

Figure 13:
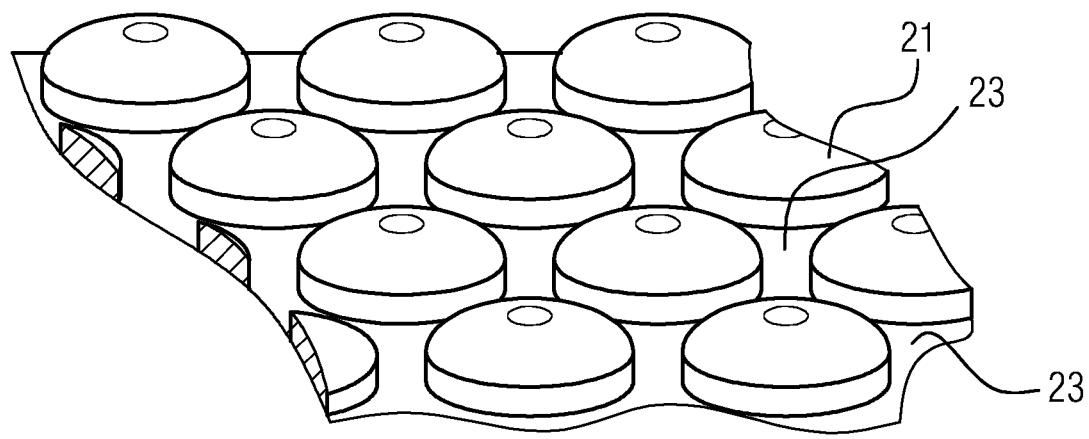
FIG. 13 shows a section of another grid of microlenses.

FIG. 13 shows another grid of microlenses 21, which are here arranged in accordance with hexagonal close packing. Opaque regions 23, which suppress stray light outside the useful range, are located between the microlenses 21.

Figure 14:
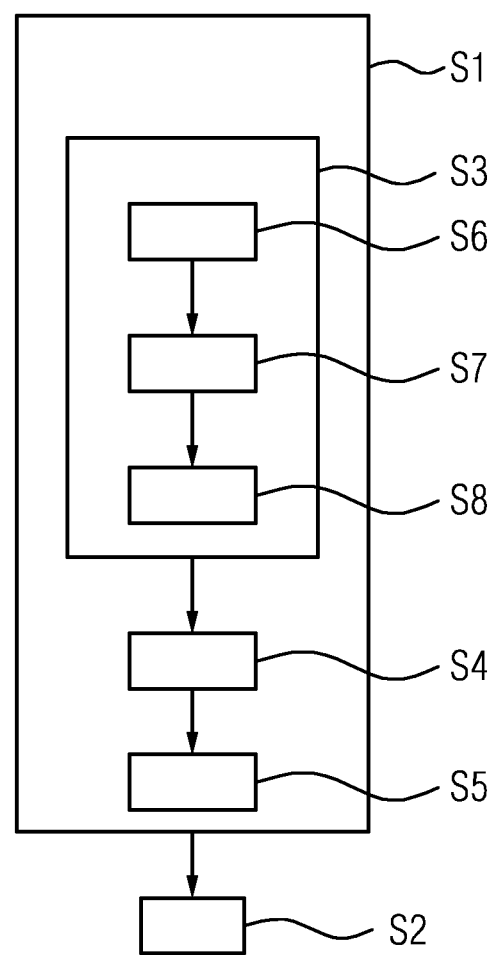
FIG. 14 shows a method according to the invention.

FIG. 14 shows an example of a method according to the invention for operating a head-up display for a vehicle, having a display panel 1, a grid of microlenses 21, 211-213 connected downstream thereof, and a mirror 3. In a first step S1, a multiplicity of elementary images 12, 121-129 are generated. Each of the elementary images 12, 121-129 corresponds to an image of an elementary camera 630 of a multiplicity of elementary cameras 630 which are arranged one next to the other. In this respect, see also FIG. 6. In a step S2, the elementary images 12, 121-129 are presented located one next to the other on the display panel 1.

Step S1 is preferably performed with the following substeps: In step S3, a multiplicity of primary elementary images 11 are calculated. Next, in step S4, the calculated primary elementary images 11 are optically multiplied. In step S5, the individual multiplied elementary images 12, 121-129, which were formed from the primary elementary images 11, are displaced with a respectively adapted absolute value by the distance ve in the direction toward the optical axis of the head-up display. In accordance with a preferred variant, steps S4 and S5 are combined.

Step S3 is preferably performed with the following substeps: In step S6, the position of the head or of the eyes 61 of a viewer is detected, and in step S7 the primary elementary images 11 to be presented on the display panel 1 or elementary images 12, 121-129 are displaced or distorted in accordance with the position change PS, and a corresponding signal is transmitted to the display panel. A distortion occurs when, for compensating a curvature of the windshield, the elementary images 12, 121-129 are more than just displaced. In step S8, the images 11, 12, 121-129 for the right and the left eye 61 are presented on the display panel 1 in alternating fashion. The illumination is performed here such that each eye 61 in each case sees only the image that is assigned thereto.

The invention proposes to use what are known as integral imaging systems as a space-saving solution for the display of virtual images in the head-up display of a motor vehicle. Integral imaging systems synthesize light fields via space-division multiplexing. That means angle ranges in the light field are controlled by way of positions in the elementary image. Since due to this space-division multiplexing for each image point in the virtual image a multiplicity of image points in the elementary images 12 are required, this represents a significant requirement in terms of the resolution, that is to say the pixel number and the pixel density of the elementary image generator, the display panel 1. In the case of visible light, the reasonably utilizable pixel density is additionally restricted by the diffraction limit of the microlens arrangement, and consequently also the achievable resolution of the virtual image. In order to fulfill current requirements in terms of the optical unit of a head-up display with pure integral imaging, more than 80,000 pixels would be required horizontally with a pixel density of more than 100 pixels per millimeter, wherein the diffraction limit sets a physical limit here, too. The proposal according to the invention relates to how to obtain a head-up display with a lower pixel number and pixel density of the display panel 1 in accordance with integral imaging.

Since the two eyes 61 of the driver are located on a horizontal axis, the stereoscopic aspects do not need to be fulfilled to the same degree for the vertical direction as for the horizontal direction. Owing to pixels having a more pronounced extent in the vertical direction than in the horizontal direction, the requirement in terms of the resolution of the display panel 1 is reduced. The necessary number of pixels per elementary image 12 depends on the size of the eyebox that needs to be simultaneously covered, what is known as the uniqueness range. The size of this eyebox is reduced to approximately an intraocular distance and consequently to half a typical width b1 of the eyebox due to the detection of the changing positions of the eyes 61, which is referred to as eye tracking, and to the dynamic adaptation of the content to be displayed on the display panel 1 to the viewer's position. This also halves the resolution requirements. A further reduction of the width of the eyebox to approximately 2 cm is possible according to the invention when in each case only one eye 61 is to be covered. To this end, the eyebox is made available in alternating fashion to both eyes by way of time-division multiplexing of the display panel 1. This requires synchronization of the content that is to be displayed on the display panel 1 and measures that make the image invisible to the respectively other eye 61.

Since in integral imaging a multiplicity of only slightly different elementary images are presented, it is of significant advantage, as is proposed by the invention, to optically derive groups of elementary images 12, 121-129 in each case from an associated primary elementary image 11, which is presented on the display panel 1. These are reduced in size here, such that both the requirement in terms of the pixel number and the requirement in terms of the pixel density of the display panel 1 are reduced. The optical derivation, here also referred to as multiplication, is realized in the exemplary embodiment by way of specially matched multiplicities of lens elements 511-513, wherein these are also interleaved to reduce the diffraction problem, see lens partial elements 510.

Due to a greater extent of the luminous points in the vertical direction, the required number of pixels of the display panel, the pixel number thereof, can be reduced by approximately one order of magnitude. Using eye tracking—corresponding systems are already increasingly present in vehicles—the required number of pixels of the display panel 1 can typically be reduced by a factor of two while simultaneously enlarging the usable width of the eyebox. For example, if the display panel 1 is actuated such that both eyes 61 are covered in alternation, the required resolution of the display panel 1 is again reduced by a factor of more than three. By way of multiple replication of the elementary images 12, 121-129 from a primary elementary image 12, the required resolution of the display panel 1 is again reduced by approximately one order of magnitude.

The combination of the technical features listed makes it possible to reduce the requirements in terms of the resolution of the display panel 1 in a manner such that it is possible, using an integral imaging system which has been developed further in accordance with the invention, to fulfill the requirements relating to a current head-up display.

The exemplary embodiment of the integral imaging head-up display according to the invention shown in FIG. 1 shows that nine elementary images 121-129 are generated from each primary elementary image 11 using an optical multiplier 5 with special lens matrices 51. The image regions required for the corresponding elementary images 121-129 are presented by the display unit 1 as primary elementary images 11. A group of presently nine lens elements 511-513, which are in each case appropriately centered, produces therefrom nine reduced-size elementary images 121-129. The entirety of all elementary images 12, in connection with the matrix made of microlenses 21, forms the virtual image VB, which appears in the exemplary embodiment shown here, via reflection at the windshield 31, at approximately d=6500 mm behind the latter.

The display panel 1 generally has square pixels. Since the stereoscopic aspects do not need to be fulfilled in the same way for the vertical direction as for the horizontal direction, an image generator with pixels having an adapted aspect ratio is advantageously used in accordance with an embodiment of the invention. The resolution of the display panel 1 is further reduced by a reduction in the width of the eyebox in combination with head tracking. The reduced-size eyebox simultaneously covers both eyes 61 and tracks the viewer. A further reduction in the width of the eyebox such that it now covers only one eye 61 results in lower requirements in terms of the resolution of the display panel 1. In this case, the eyebox is made available to both eyes 61 in alternating fashion. At the same time, the image content on the display panel 1 is accordingly adapted for the respective eye 61 and measures are taken that make the image content invisible to the respective other eye 61.

As is typical in optics, fundamental functions can be realized by way of a variety of arrangements. For example, imaging can be realized via lenses, mirrors, holograms and many more. The multiplication of images is realizable via multiple reflections, via gratings, via an arrangement of beam splitters, and others. The multiplicity of possibilities is known to the person skilled in the art and will therefore not be presented here in detail. It is to be understood that not only the possibilities and combinations described in the introductory part of the description and in the exemplary embodiments, but also alternatives, further developments and combinations which lie within the capability of the person skilled in the art fall into the scope of the invention.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A head-up display for a vehicle, comprising:
a display panel configured to produce a plurality of primary elementary images for display and to project first light rays corresponding to each of the plurality of primary elementary images in a downstream direction;
an optical multiplier having a plurality of n×m lens matrices connected downstream of the display panel, each n×m lens matrix being configured to optically multiply the first light rays received from the display panel corresponding to each respective one of the plurality of primary elementary images into a plurality of n×m elementary images and to project second light rays corresponding to each of the plurality of n×m elementary images in a downstream direction downstream of the optical multiplier;
a deflector having a plurality of microlenses, the deflector being arranged and configured downstream of the optical multiplier and of the display panel, such that the corresponding second light rays of the n×m elementary images are incident on, in each case, one of the plurality of microlenses, the deflector having a number of the microlenses that corresponds to the number of the elementary images; and
an image generator that generates an image signal that actuates the display panel, the image generator being configured to generate the image signal by which the display panel represents a plurality of elementary images, such that each of the plurality of elementary images is assigned to a respective one of the plurality of microlenses, wherein the display panel produces for display the plurality of primary elementary images,
wherein the optical multiplier is further configured to cause, in addition to the multiplication, one or more selected from the group of: a displacement and a distortion, to compensate for a change in a position of an eye of a viewer of the head-up display.

2. The head-up display as claimed in claim 1, wherein the image generator comprises a calculator.

3. The head-up display as claimed in claim 1, wherein lens elements of the n×m lens matrix are decomposed into lens partial elements which are arranged interleaved to form each n×m lens matrix.

4. The head-up display as claimed in claim 3, wherein the optical multiplier has a plurality of n×m prism matrices.

5. The head-up display as claimed in claim 4, wherein prism elements of the n×m prism matrix have a diffuser.

6. The head-up display as claimed in claim 1, further comprising:
a position detector; and
an image displacer configured to receive a position signal detected by the position detector.

7. The head-up display as claimed in claim 6, further comprising an image alternator.

8. The head-up display as claimed in claim 1, wherein the image generator has a calculator, and, in the optical multiplier: the lens elements of each n×m lens matrix are decomposed into lens partial elements arranged interleaved to form the respective n×m lens matrix; and
the optical multiplier has a plurality of n×m prism matrices, the prism elements of each n×m prism matrix having a diffuser,
the head-up display further comprising:
a position detector, and an image displacer configured to receive a position signal detected by the position detector, and
an image alternator.

9. A method for operating a head-up display for a vehicle, having a display panel, an optical multiplier having a plurality of n×m lens matrices connected downstream of the display panel, a deflector having a grid of microlenses connected downstream of the display panel and the optical multiplier, and a mirror, the method comprising:
generating a plurality of primary elementary images each of which corresponds to an image of a respective one of a plurality of adjacently arranged elementary cameras;
producing for display the primary elementary images located one next to the other on the display panel and projecting first light rays corresponding to each of the plurality of primary elementary images in the downstream direction;

optically multiplying the first light rays received from the display panel corresponding to each respective one of the plurality of primary elementary images into a plurality of elementary images, such that each of the plurality of primary elementary images is multiplied into n×m elementary images, and projecting second light rays corresponding to each of the plurality of n×m elementary images in a downstream direction downstream of the optical multiplier and toward the deflector; and one or more selected from the group of: displacing and distorting, to compensate for a change in a position of the head or the eyes of a viewer of the head up display.

10. The method as claimed in claim 9, further comprising: calculating the plurality of primary elementary images.

11. The method as claimed in claim 10, further comprising one of:

displacing individual multiplied elementary images, which were formed from the primary elementary images, with a respectively adapted absolute value in the direction toward an optical axis of the head-up display, and displacing and distorting individual multiplied elementary images, which were formed from the primary elementary images, with a respectively adapted absolute value in the direction toward the optical axis of the head-up display.

12. The method as claimed in claim 11, further comprising:

detecting the position of the head or of the eyes of the viewer, and displacing the images, presented on the display panel, in accordance with a detected change in the position.

13. The method as claimed in claim 9, further comprising:

presenting the images for the right and the left eye on the display panel in alternating fashion; and creating access for the respective eye.

14. The method as claimed in claim 9, further comprising:

calculating a plurality of primary elementary images, displacing individual multiplied elementary images, which were formed from the primary elementary images, with a respectively adapted absolute value in the direction toward the optical axis of the head-up display, detecting the position of one of the head and the eyes of the viewer, displacing the images, presented on the display panel, in accordance with a detected change in the position, presenting the images for the right and the left eye on the display panel in alternating fashion, and creating access for the respective eye.

15. The method as claimed in claim 9, further comprising:

calculating a plurality of primary elementary images, displacing and distorting individual multiplied elementary images, which were formed from the primary elementary images, with a respectively adapted absolute value in the direction toward the optical axis of the head-up display, detecting the position of one of the head and the eyes of the viewer, displacing the images, presented on the display panel, in accordance with a detected change in the position, presenting the images for the right and the left eye on the display panel in alternating fashion, and creating access for the respective eye.

* * * * *